United States Patent [19]

Oosterling et al.

[11] 4,126,988
[45] Nov. 28, 1978

[54] MOWING DEVICE

[75] Inventors: Pieter A. Oosterling; Hendricus C. van Staveren, both of Nieuw-Vennep, Netherlands

[73] Assignee: Multinorm B.V., Nieuw-Vennep, Netherlands

[21] Appl. No.: 729,828

[22] Filed: Oct. 5, 1976

[30] Foreign Application Priority Data

Oct. 10, 1975 [NL] Netherlands ............... 7511969

[51] Int. Cl.² .................................................. A01D 55/18
[52] U.S. Cl. ..................................................... 56/295
[58] Field of Search ................... 56/295, 255, 6, 13.6

[56] References Cited

U.S. PATENT DOCUMENTS

| | | | |
|---|---|---|---|
| 551,236 | 12/1895 | Smith | 56/295 |
| 604,189 | 5/1898 | Davis | 56/295 |
| 969,817 | 9/1910 | Weathern | 56/295 |
| 3,604,189 | 9/1971 | Harer et al. | 56/295 |

*Primary Examiner*—Russel R. Kinsey
*Attorney, Agent, or Firm*—John P. Snyder

[57] ABSTRACT

A mowing device comprises a housing extending transversely of the direction of movement of the mower, a plurality of cutting members rotatably journalled at said housing and a driving gear accommodated in said housing for driving the cutting members, each cutting member comprising at least one disc skimming the housing and at least one cutter fastened to the periphery or the top side of the disc. In order to eliminate the risk of damage of the mowing device due to stones jammed between the discs filling means are provided in each space at the front edge of the housing, limited by every pair of cutting members and converging in the direction of rotation of said cutting members.

10 Claims, 4 Drawing Figures

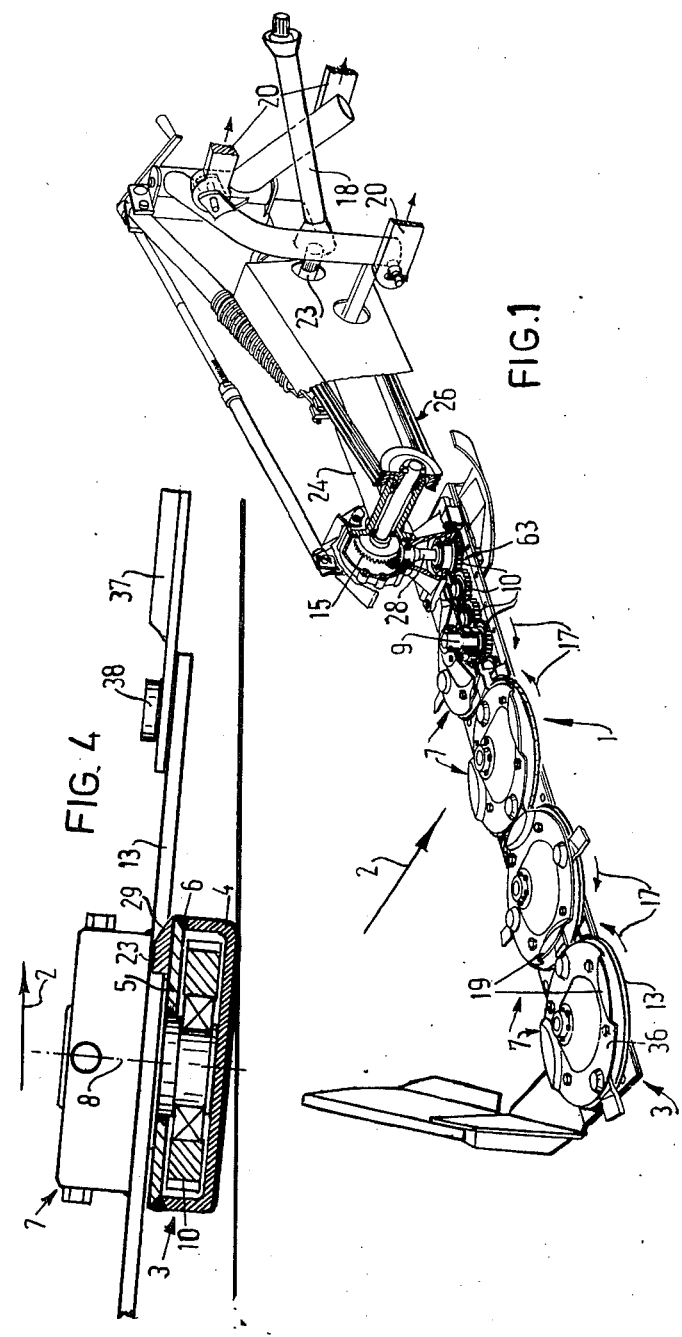

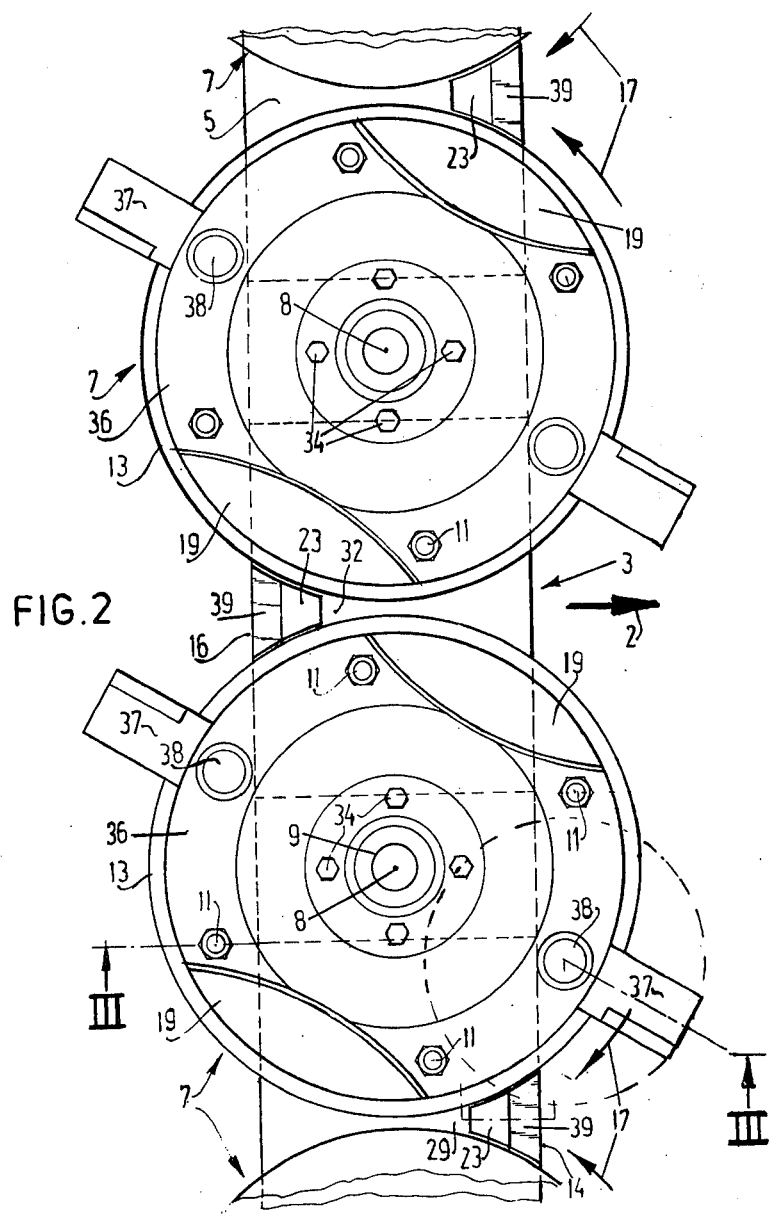

MOWING DEVICE

The invention relates to a mowing device comprising a housing extending transversely of the direction of movement of the mower, a plurality of cutting members rotatably journalled at said housing and a driving gear accommodated in said housing for driving the cutting members, each cutting member comprising at least one disc skimming the housing and at least one cutter fastened to the periphery or the top side of the disc.

Such a mowing device is known. Herein stones may become jammed in between two discs rotating in opposite senses so that the mowing device may be seriously damaged.

The invention has for its object to provide a simple mowing device, in which the risk of damage of the mowing device due to stones jammed between the discs is eliminated.

The mowing device of the kind set forth is improved in accordance with the invention by using filling means in each space at the front edge of the housing, limited by every pair of cutting members and converging in the direction of rotation of said cutting members. Although the risk of jamming stones on the rear edge of the housing is less imminent than at the front edge it is preferred to use filling means also in each space bounded by each pair of cutting members at the rear edge of the housing and converging in the direction of rotation of said cutting members.

The filling means may each be formed by a lug provided on the cover of the housing.

The above-mentioned and further features of the invention will become apparent from the following description of preferred embodiments of the mowing device in accordance with the invention.

In the drawing:

FIG. 1 is a perspective view, partly broken away, of a mowing device in accordance with the invention, FIG. 2 is an enlarged plan view, partly broken away, of said mowing device on an enlarged scale, FIG. 3 is a sectional view taken on the broken line III—III in FIG. 2, and FIG. 4 is a sectional view like FIG. 3 of a variant of the device in accordance with the invention.

Referring to FIG. 1, the mowing device 1 is attached by means of an auxiliary frame 24 to a framework 22 suspended from the hitch rods 20 of a tractor (not shown) and is driven through a bevel gear system 15 and a pulley drive 26 via a universal shaft 18 by the power take-off shaft of the tractor.

The mowing device 1 according to the invention comprises a housing 3 extending transversely of its intended direction of movement 2 and shaped in the form of a flat, elongated beam mainly comprising a channel shaped member 4, to which a cover 5 is secured by welds 6. At the housing 3 a plurality of cutting members 7 are arranged so as to be rotatable about upright axes 8. The cutting members 7 are disposed near and above the housing 3 and are adapted to rotate pairwise in opposite directions 17. Each cutting member 7 is rigidly connected through a shaft 9 with a gear 10 of a driving gear means 63 accommodated in the housing 3 and formed by a sequence of gears 10, said gear means 63 being driven through a shaft 28 by the bevel gear system 15.

Referring to FIG. 3, the shaft 9 of each cutting member 7 is rotatably journalled in an upright collar 31 of the cover 5 in a bearing 30.

Each cutting member 7 comprises a disc 36 fastened by screws 34 to a hub 35 and a disc 13 fastened beneath the former by means of bolts 11 and spacer rings 12, one or more, for example, two cutters 37 being fastened between said discs. The cutters 37 pass between neighbouring discs 36 and 13 without coming into contact herewith, for which purpose the discs 36 have upwardly bulging parts 19. The cutters 37 of neighbouring cutting members 7 are relatively off-set through an angle of 90° so that they do not touch one another though the cutter paths overlap one another. Each cutter 37 is freely rotatable about a pin 38.

According to the invention, filling means formed by lugs 23 are provided in each space 29 and 32 at the front edge 14 and the rear edge 16 of the housing 3, said spaces being bounded by each pair of cutting members 7 and converging in the direction of rotation 17 of the cutting members 7. Each lug 23 is welded to the cover 5 and has an upwardly sloping surface 39 extending in the direction of convergence. In this simple manner stones are prevented from being jammed between two neighbouring cutting members 7 in the converging spaces 29 and 32.

It should be noted that the lugs 23 may also be used, if each cutting member 7 shown in FIG. 4 has only one disc 13 skimming across the housing 3 and the cutters 37 are arranged on the top side of said disc 13.

In all embodiments shown the mowing device 1 has a low structure and the shape of the cutting members 7 is such that the mowing device 1 can readily pass beneath the cut crop. The circumferential speed of the cutters 37 is very high, for example, about 80 ms/sec with a path diameter e of 45 to 50 cms.

During the mowing operation the mowing device 1 is held in a slightly forwardly inclined position so that the cutting members 7 are at an angle f to the ground surface 66.

What we claim is:

1. A mowing device comprising a housing extending transversely of the direction of movement of the mowing device, a plurality of cutting members rotatably journalled on the housing and driving gear means accommodated in said housing for driving adjacent pairs of cutting members in relatively opposite directions, each cutting member comprising at least one disc skimming the top of the housing, at least one cutter fastened to the periphery or the top side of the disc, the discs of each pair being spaced to expose the top of the housing therebetween whereby each pair of discs and the exposed housing therebetween define a channel which comprises a first portion converging rearwardly from the front edge of the housing and a second portion diverging rearwardly to the rear edge of the housing, and filling means on said housing between each pair of cutting members and extending rearwardly from the front edge of the housing for substantially filling each said first portion of a channel.

2. A mowing device as claimed in claim 1, and further filling means on said housing between adjacent discs of adjacent pairs of cutting members and extending forwardly from the rear edge of said housing for substantially filling second portions of channels between such adjacent pairs.

3. A mowing device as claimed in claim 1, characterized in that each filling means is in the form of a lug arranged on the top of the housing.

4. A mowing device as claimed in claim 3, characterized in that the lug is welded to the top of the housing.

5. A mowing device as claimed in claim 3, characterized in that the lug is inclined upwardly from the front edge of the housing.

6. A mowing device as claim in claim 2, characterized in that each filling means is in the form of a lug arranged on the top of the housing.

7. A mowing device as claimed in claim 6, characterized in that the lug is welded to the top of the housing.

8. A mowing device as claimed in claim 4, characterized in that the lug is inclined upwardly from the front edge of the housing.

9. A mowing device as claimed in claim 6, characterized in that the lug is inclined upwardly from the front edge of the housing.

10. A mowing device as claimed in claim 7, characterized in that the lug is inclined upwardly from the front edge of the housing.

* * * * *